(12) United States Patent
Polak et al.

(10) Patent No.: US 9,733,379 B2
(45) Date of Patent: Aug. 15, 2017

(54) LINE LOCATOR WITH A METAL DETECTOR

(71) Applicant: Vivax-Metrotech, Santa Clara, CA (US)

(72) Inventors: Stevan Polak, Santa Clara, CA (US); Chunning Zhang, Santa Clara, CA (US)

(73) Assignee: METROTECH CORPORATION, San Jose, CA (US)

( * ) Notice: Subject to any disclaimer, the term of this patent is extended or adjusted under 35 U.S.C. 154(b) by 0 days.

(21) Appl. No.: 14/309,398

(22) Filed: Jun. 19, 2014

(65) Prior Publication Data

US 2015/0369942 A1   Dec. 24, 2015

(51) Int. Cl.
G01V 3/10    (2006.01)
G01V 3/15    (2006.01)

(52) U.S. Cl.
CPC ............... G01V 3/107 (2013.01); G01V 3/15 (2013.01)

(58) Field of Classification Search
None
See application file for complete search history.

(56) References Cited

U.S. PATENT DOCUMENTS

| | | | |
|---|---|---|---|
| 4,598,260 A | | 7/1986 | Carr |
| 5,541,516 A | | 7/1996 | Rider et al. |
| RE35,607 E | * | 9/1997 | Nagamune ............. B22D 2/003 |
| | | | 324/326 |
| 5,721,489 A | * | 2/1998 | Weaver ..................... G01V 3/15 |
| | | | 324/233 |
| 6,130,539 A | * | 10/2000 | Polak ....................... G01V 3/15 |
| | | | 324/326 |
| 6,326,790 B1 | * | 12/2001 | Ott ........................... G01V 3/15 |
| | | | 324/236 |
| 6,411,073 B1 | | 6/2002 | Fischer et al. |
| 6,541,966 B1 | * | 4/2003 | Keene ..................... G01V 3/08 |
| | | | 324/225 |
| 7,057,383 B2 | | 6/2006 | Schlapp et al. |
| 7,062,414 B2 | | 6/2006 | Waite et al. |
| 7,432,715 B2 | | 10/2008 | Stamatescu |
| 2003/0042988 A1 | * | 3/2003 | Nagasaku ............ H03B 5/1864 |
| | | | 331/158 |
| 2004/0035206 A1 | | 2/2004 | Ward et al. |

(Continued)

FOREIGN PATENT DOCUMENTS

| | | |
|---|---|---|
| CA | 2813496 A1 | 9/2015 |
| WO | 2006/015310 A1 | 2/2006 |

OTHER PUBLICATIONS

International Search Report for PCT Application No. PCT/US2015/035880 issued by the US Searching Authority on Sep. 18, 2015; pp. 1-2.

(Continued)

Primary Examiner — Jermele M Hollington
Assistant Examiner — Douglas X Rodriguez
(74) Attorney, Agent, or Firm — Haynes and Boone, LLP (57) ABSTRACT

A line locator system that includes a metal detector is disclosed. In accordance with some embodiments of the invention, the line locator system includes a digital signal processor in a housing; a line locator portion mounted in the housing and coupled to the digital signal processor; and an active metal detector mounted in the housing and coupled to the digital signal processor.

18 Claims, 11 Drawing Sheets

(56) References Cited

U.S. PATENT DOCUMENTS

| | | | | |
|---|---|---|---|---|
| 2004/0239297 A1* | 12/2004 | Sinha | .................... | G01V 3/12 |
| | | | | 323/235 |
| 2005/0036265 A1* | 2/2005 | Hasegawa | ............... | H01L 23/48 |
| | | | | 361/143 |
| 2006/0036376 A1* | 2/2006 | Gudmundsson | ....... | G01V 3/081 |
| | | | | 702/38 |
| 2012/0086455 A1* | 4/2012 | McAdam | ............... | G01V 3/107 |
| | | | | 324/326 |
| 2012/0206138 A1* | 8/2012 | Derungs | ................ | G01V 3/107 |
| | | | | 324/258 |
| 2015/0168458 A1* | 6/2015 | Gannaway | ............. | G01V 3/107 |
| | | | | 324/234 |
| 2015/0276964 A1* | 10/2015 | McAdam | ................. | G01V 3/10 |
| | | | | 324/329 |

OTHER PUBLICATIONS

Written Opinion for PCT Application No. No. PCT/US2015/035880 issued by the US Searching Authority on Sep. 18, 2015; pp. 1-3.

* cited by examiner

LINE LOCATOR WITH A METAL DETECTOR

BACKGROUND

1. Technical Field

The present disclosure relates to a location of utility resources and, in particular, to a line locator with an integrated metal detector.

2. Discussion of Related Art

Underground pipe and cable locators (often termed line locators) have existed for many years and are described in many issued patents and other publications. Line locator systems typically include a mobile receiver and a transmitter. The transmitter is coupled to a target conductor, either by direct electrical connection or through induction, to provide a current signal on the target conductor. The receiver detects and processes signals resulting from the magnetic field generated at the target conductor as a result of the current signal, which can be a continuous wave sinusoidal signal provided to the target conductor by the transmitter.

In addition to location of the underground line, there is also often a need to locate other metallic objects that are associated with access to the underground line. Such objects include, for example, manhole covers and access hatches. Such hatches and manhole covers may be buried or paved over.

Therefore, there is a need for line location systems capable of also locating other metallic objects.

SUMMARY

In accordance with some embodiments, a line locator system includes a digital signal processor in a housing; a line locator portion mounted in the housing and coupled to the digital signal processor; and an active metal detector mounted in the housing and coupled to the digital signal processor.

These and other embodiments will be described in further detail below with respect to the following figures.

BRIEF DESCRIPTION OF THE DRAWINGS

The drawings may be better understood by reading the following detailed description.

DETAILED DESCRIPTION

Embodiments of the present invention allow for enhanced utilization of line locator systems with the addition of metal detection capability. Some embodiments of metal detectors that can be incorporated within the line locator system according to the present invention allow for precise location of metal objects without significantly increasing the size, shape, or weight of the line locator instrument.

Line locator systems that provide precise location of underground cables and pipes have been disclosed, for example, in U.S. Pat. No. 6,411,073 and U.S. Pat. No. 7,057,383, both of which are herein incorporated by reference in their entirety. Such systems often use a transmitter that is connected to the target line (cable or metallic pipe) and a multi-antenna hand-held detector that detects the magnetic fields generated off the target line as a result of a transmitted signal. Such line locator systems can be used to precisely locate, in three dimensions, a line with respect to the detector. However, in a practical line location environment, there is often a need to also locate other metal objects, for example access covers or manhole covers. Such metal objects may not be accessible to allow contact with a transmitter. Therefore, a metal detector is used, requiring the field personnel to carry additional instrumentation. Metal detectors often are large and bulky with a very large antenna footprint.

Figure 1:
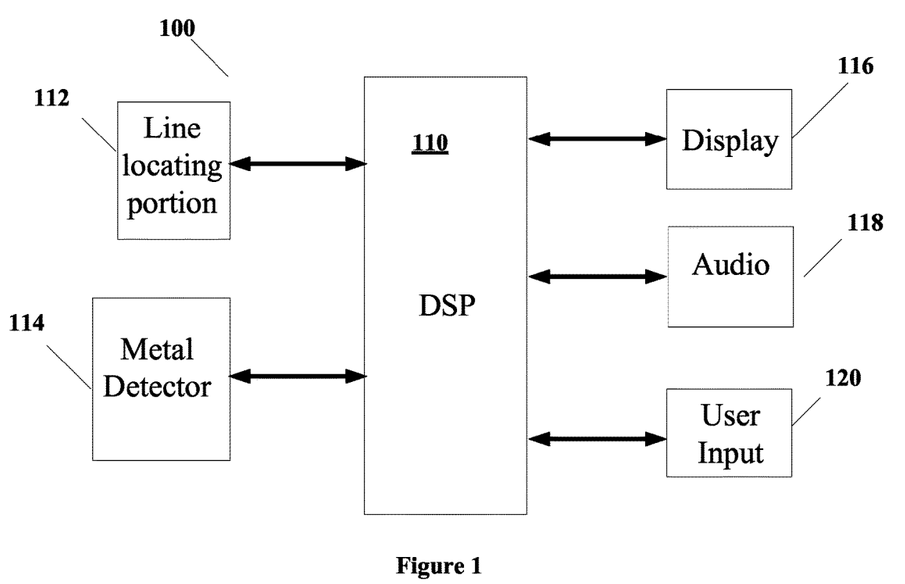
FIG. 1 illustrates a line locator system according to some embodiments of the present invention.

FIG. 1 illustrates generally a line locator system 100 according to some embodiments of the present invention. As illustrated in FIG. 1, line locator system 100 is controlled by a digital signal processor (DSP) 110. DSP 110 can receive and analyze signals from a variety of inputs, can provide signals, and can display results. DSP 110 can include one or more processors, memory (both volatile and non-volatile), and interfaces to communicate with a number of devices and to send and receive signals. DSP 110 is programmable and operates software (firmware) that is loaded into non-volatile memory. DSP 110 can, for example, be an Analog Devices Blackfin processor.

As shown in FIG. 1, DSP 110 is coupled to a display 116, an audio output 118, and a user input 120. Display 116 can, for example, be a low-powered LCD display or other type of visual display to provide results to a user. Audio output 118 can be speaker that is driven to indicate proximity to a line or to another located device. User input 120 can include any number of switches, keypads, or other input devices to allow a user to control operation of line locator system 100. DSP 110 can also be coupled to a number of devices, for example a GPS, Bluetooth, interfaces for communicating with the web, USB ports, vibrator alarm, and other devices.

As further shown in FIG. 1, DSP 110 is coupled to a line locator portion 112. Under the control of DSP 110, line locator portion 112 detects and processes signals from one or more antennas that detect a magnetic field generated by a separate transmitter connected to the target line. Locator 112 can be any type of line locator portion and can have any number of sensor antennas.

Figure 2:
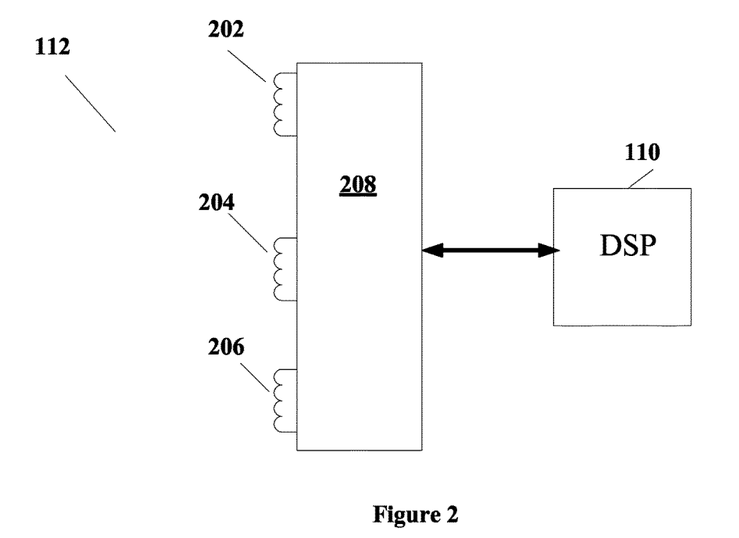
FIG. 2 illustrates an example of a line locator portion of the line locator system according to some embodiments of the present invention.

FIG. 2 illustrates an example line locator 112. In the example line locator 112 shown in FIG. 2, three receiver antennas are used: antenna 202, antenna 206, and antenna 204. Antenna 202 and antenna 206 are oriented to detect magnetic fields in the same direction and are separated vertically. The vertical separation and detection of the parallel magnetic fields can be used to determine depth of the underground line. Antenna 204 is oriented to detect magnetic fields in a direction that is perpendicular to that of antennas 202 and 206. Antenna 204 can provide directionality for the underground line. All three of antennas 202, 204, and 206 are typically arranged to detect magnetic fields directed horizontally to the surface of the earth when line locator system 100 is held in a normal fashion by the user. As is further shown in FIG. 2, antennas 202, 204, and 206 are coupled to location electronics 208. Location electronics 208 receive signals from antennas 202, 204, and 206, electronically process those signals (e.g. providing amplification, filtering, and other functions) and provide signals to DSP 110 for digital processing.

As is further shown in FIG. 1, DSP 110 is coupled to a metal detector 114. Metal detector 114 is fully integrated with line locator system 100, including being included in the same housing as the line locator portion 112 and sharing the resources of DSP 110. According to some embodiments, metal detector 114 is small enough to be easily positioned within the housing of line locator system 100, sensitive enough to easily detect buried metal objects, and efficient enough to not substantially drain the batteries of line locator system 100.

Figure 3:
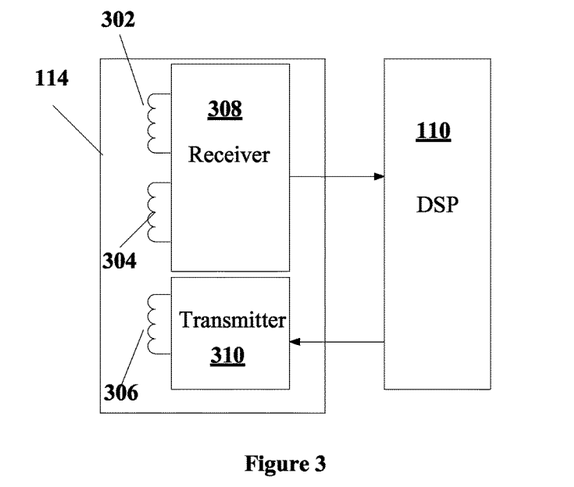
FIG. 3 illustrates a metal detector portion of the line locator system according to some embodiments of the present invention.

Metal detector 114 is further illustrated in FIG. 3. In the example illustrated in FIG. 3, metal detector 114 is an active metal detector and includes antennas 302 and 304 coupled to receiver electronics 308 and transmitter antenna 306 coupled to transmitter electronics 310. As shown in FIG. 6C, Antennas 302 and 304 can be loop antennas arranged such that the planes 622 and 624, respectively, of the antenna loops are parallel, to measure the same magnetic field perpendicular to the loops, and separated by a distance D. Transmitter antenna 306 is positioned substantially equidistant between antennas 302 and 304 and oriented to generate a magnetic field 620 in a first direction through antenna 302 and a magnetic field in the opposite direction through antenna 304. In that fashion, the magnetic field generated by antenna 306 can be nullified by differentially measuring the fields in antennas 302 and 304.

Figure 4A:
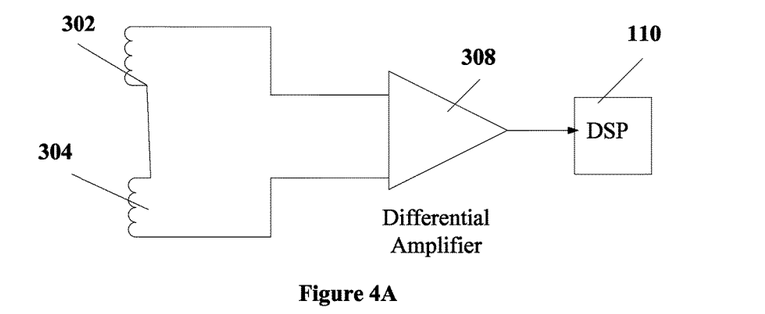
FIG. 4A illustrates an example receiver section of the metal detection portion of the line locator system according to some embodiments of the present invention.

FIG. 4A illustrates an example of receiver electronics 308. As shown in FIG. 4A, antennas 302 and 304 are coupled to provide a differential input to a differential amplifier 308. Antennas 302 and 304 are arranged such that the magnetic field generated by transmitter antenna 306 is substantially canceled in differential amplifier 308. The output signal from differential amplifier 308 is input into DSP 110 for further processing.

With reference to FIGS. 4A and 6C, when a metallic object is brought into proximity with antennas 302 and 304, a distortion of the magnetic field results that generates a difference between the signals detected by antennas 302 and 304. That difference is then amplified by differential amplifier 308. The effect of the distortion, however, differs depending on whether the object is ferromagnetic or conductive. Proximity to a ferromagnetic material will cause the difference in signals between antennas 302 and 304 to change in a different direction (i.e. the differential signals will either increase or decrease with proximity) than will proximity to a conductive material (which results in an eddy current distortion of the field). Therefore, whether the differential signal increases or decreases can be dependent upon the materials properties of the object rather than proximity. However, the intensity of the change is a result of proximity. In some embodiments, different materials can be placed in magnetic field 620 in order to bias the differential signal produced by differential amplifier 308. In particular, metal detector 114 can be tuned so that as a metal object such as a non-ferromagnetic manhole cover is brought into proximity, the differential signal is increased.

Figure 4B:
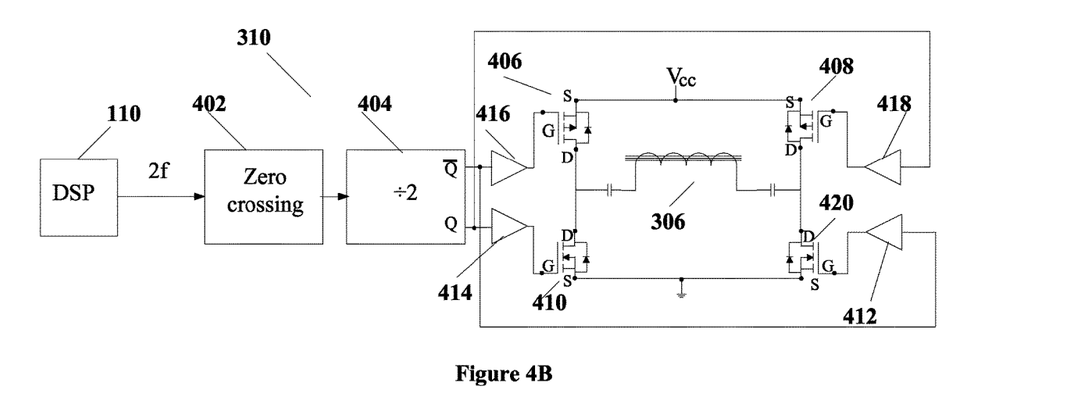
FIG. 4B illustrates an example transmitter section of the metal detection portion of the line locator system according to some embodiments of the present invention.

FIG. 4B illustrates antenna 306 and transmitter 310. As shown in FIG. 4B, DSP 110 provides a signal to a zero crossing detector 402. The signal from DSP 110 can be a sine wave with a frequency 2f, where f is the frequency of the magnetic field generated and detected in metal detector 114. Zero crossing detector 402 provides a square wave having the same phase as the sine wave produced by DSP 110. The square wave from zero crossing detector 402 is input into a divide-by-2 404, which produces a square wave Q with frequency f and its complement $\bar{Q}$.

Antenna 306 is bridged between switches in a switching bridge formed by switches 406, 480, 410, and 420. Antenna 306 can be a wire-wound coil with a ferrite core, which can generate a magnetic field according to a current applied across the coil. Switches 406, 480, 410, and 420, driven by the output signals from divide-by-2 404, can alternately switch the voltage across antenna 306 from +Vcc to −Vcc, resulting in an alternating current through antenna 306. In some embodiments, the alternating voltage can be coupled into antenna 306 through capacitors.

As shown in FIG. 4B, switches 406 and 410 are serially coupled between Vcc and ground. The node between switches 406 and 410 is coupled to one side of antenna 306. Similarly, switches 408 and 420 are serially coupled between Vcc and ground and the node between switches 408 and 420 is coupled to the side of antenna 306 opposite that coupled to switches 406 and 410.

Switches 406 and 420 are coupled to the complement signal $\bar{Q}$ from divide-by-2 404 through drivers 416 and 412, respectively. Switches 410 and 408 are coupled to the signal Q from divide-by-2 404 through drivers 414 and 418, respectively. Therefore, current is driven through antenna 306 in alternate directions, causing antenna 306 to generate the magnetic field as discussed above.

Figure 5A:
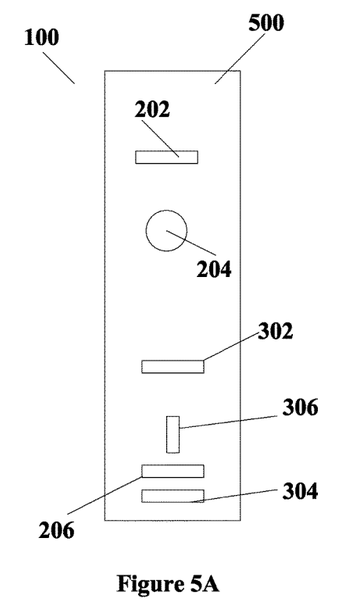
FIGS. 5A, 5B, and 5C illustrate physical mounting of antennas used in a line locator system according to some embodiments of the present invention.
Figures 5B, 5C:
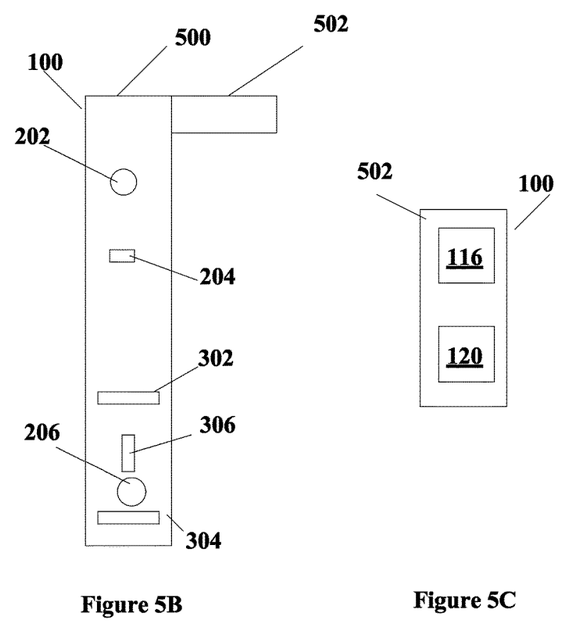

FIGS. 5A and 5B illustrate positioning of antennas 202, 204, 206, 302, 306, and 304 within a housing 500 of line locator system 500. As shown in FIG. 5A, when line locator system 100 is held normally, line locator antennas 202 and 206 are parallel oriented and separated vertically while antenna 204 is oriented perpendicular to antennas 202 and 206. As is further shown, metal detector antennas 302 and 304 are separated vertically when line locator system 100 is held normally. Antennas 302 and 304 are loop antennas with an inside diameter greater than a width of the antenna, with the inner planes being parallel. Antenna 306 is a wire-wound coil oriented to produce a magnetic field perpendicular to the inner planes of antennas 302 and 304, located at the midpoint between antennas 302 and 304 so that the magnetic field produced at antennas 302 and 304 is opposite in direction but substantially equal in strength.

FIG. 5B illustrates placement of antennas 202, 204, 206 and 302, 304 and 306 from a side of housing 500. As is further shown in FIG. 5B, housing 500 includes a handle portion 502. In operation, housing 500 is held by the handle so that handle 502 is roughly parallel to the ground, causing antennas 202, 204, 206 and 302, 304 and 306 to be distributed in substantially a vertical fashion relative to the ground.

FIG. 5C illustrates a top view of handle 502. As shown in FIG. 5C, display 116 and user input 120 can be placed on handle 502 for ease of use. Other switches may be located in other areas of housing 500.

Figure 6A:
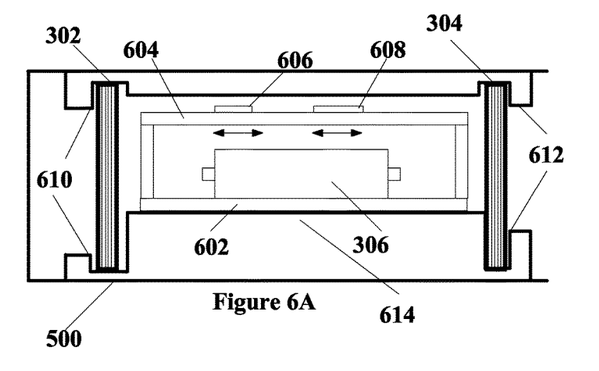
FIGS. 6A and 6B illustrate the physical mounting of components of the metal detector portion of the line locator system according to some embodiments of the present invention.

FIG. 6A further illustrates the physical arrangement of antennas 302, 304 and 306 as mounted in housing 500. As shown in FIG. 6A, antennas 302 and 304 are mounted within housing 500 while antenna 306 is mounted between antennas 302 and 304. Antennas 302 and 304 can, for example, be inserted into slots 610 and 612, respectively, formed in housing 500. Slots 610 and 612 are sized so that antennas 302 and 304 are held within housing 500. Antenna 306 is mounted on a circuit board 602 that is mounted on a platform 614 in housing 500. Structure 604 is mounted to circuit board 602. Tuners 606 and 608 are mounted on structure 604 and adjacent to antenna 306. In some embodiments, metal detector 114 can be mounted on a separate module that is fixed within housing 500.

Figure 6B:
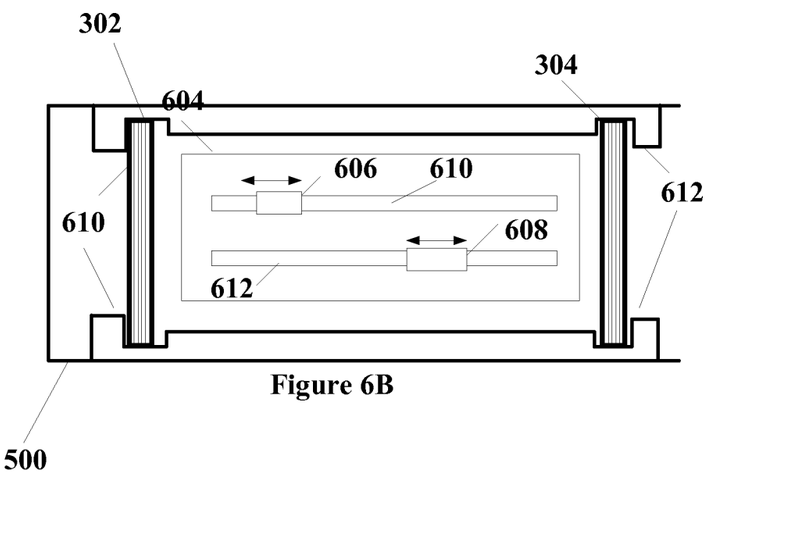
Figure 6C:
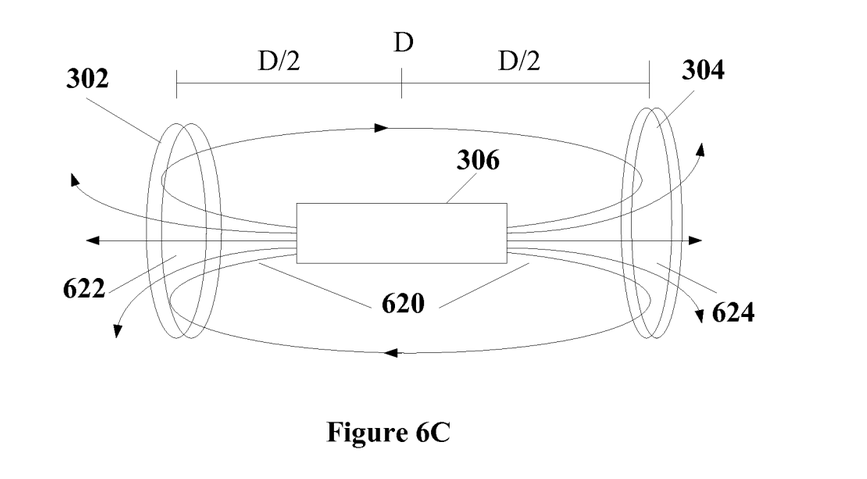
FIG. 6C illustrates the magnetic fields in the metal detector shown in FIGS. 6A and 6B.
Figure 7:
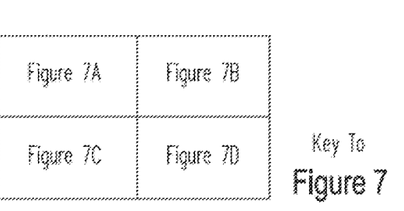
FIGS. 7A-7D illustrate an example of the transmitter section of the metal detector portion of the line locator system according to some embodiments of the present invention.
Figure 7A:
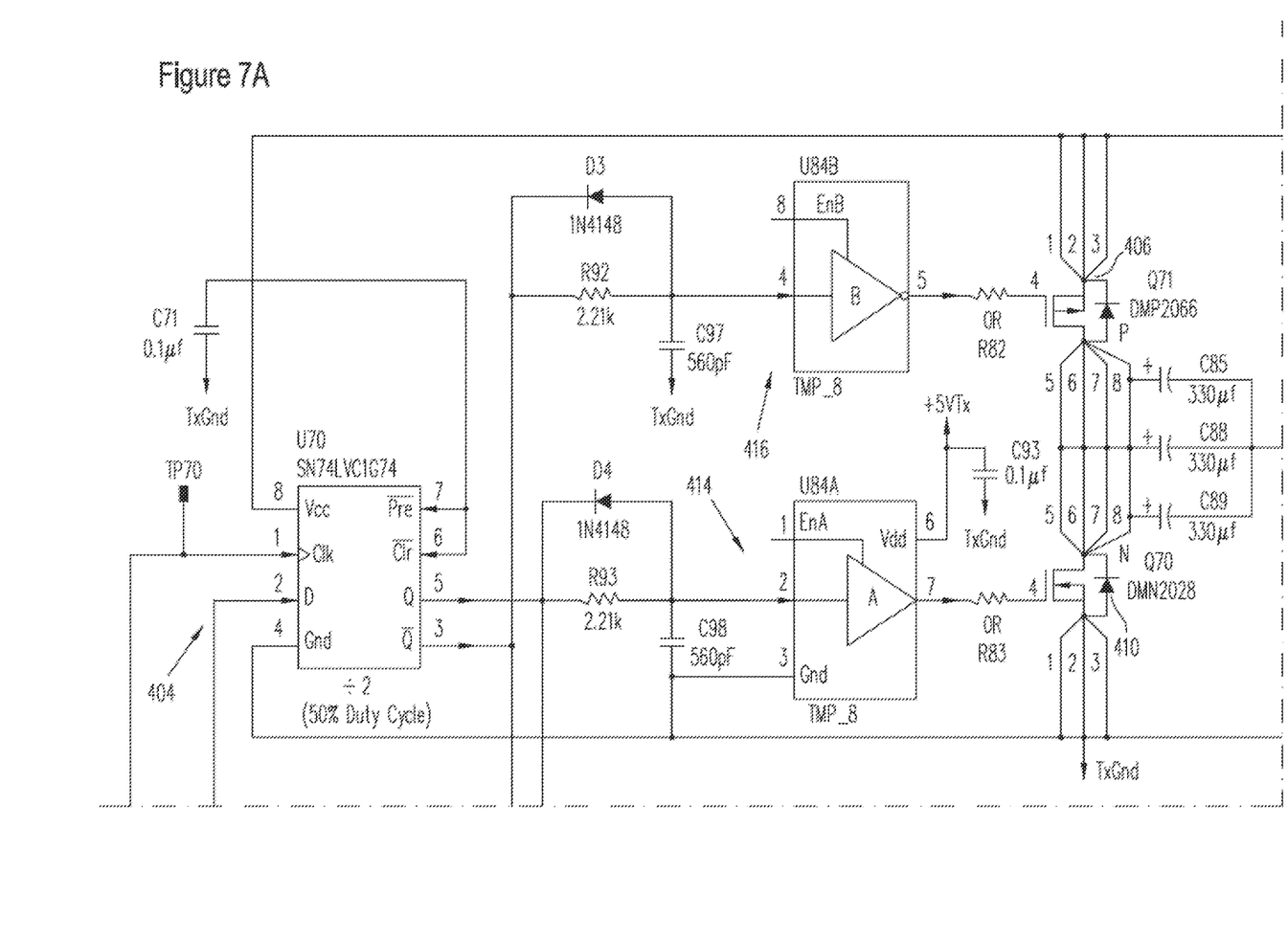
Figure 7B:
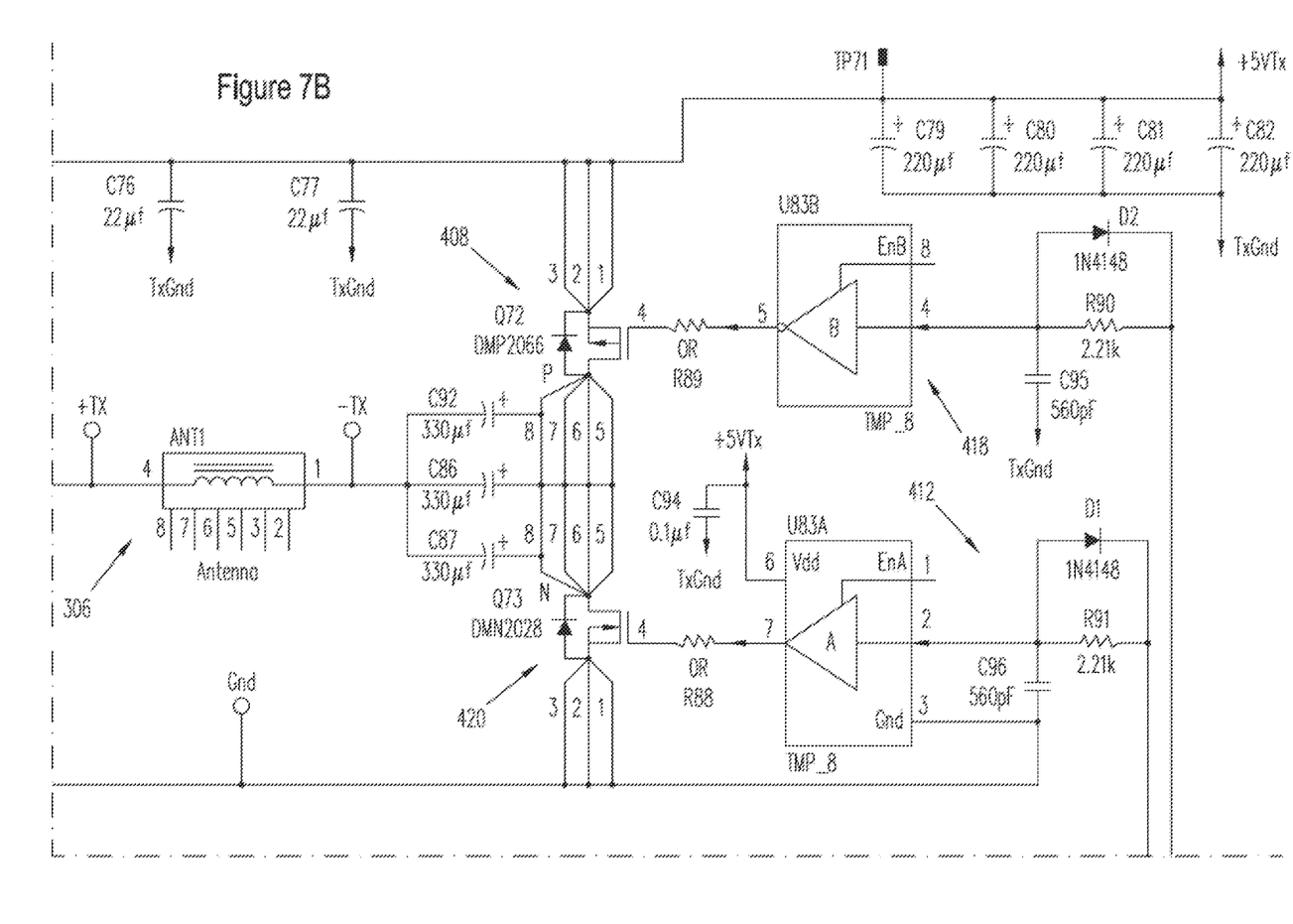
Figure 7C:
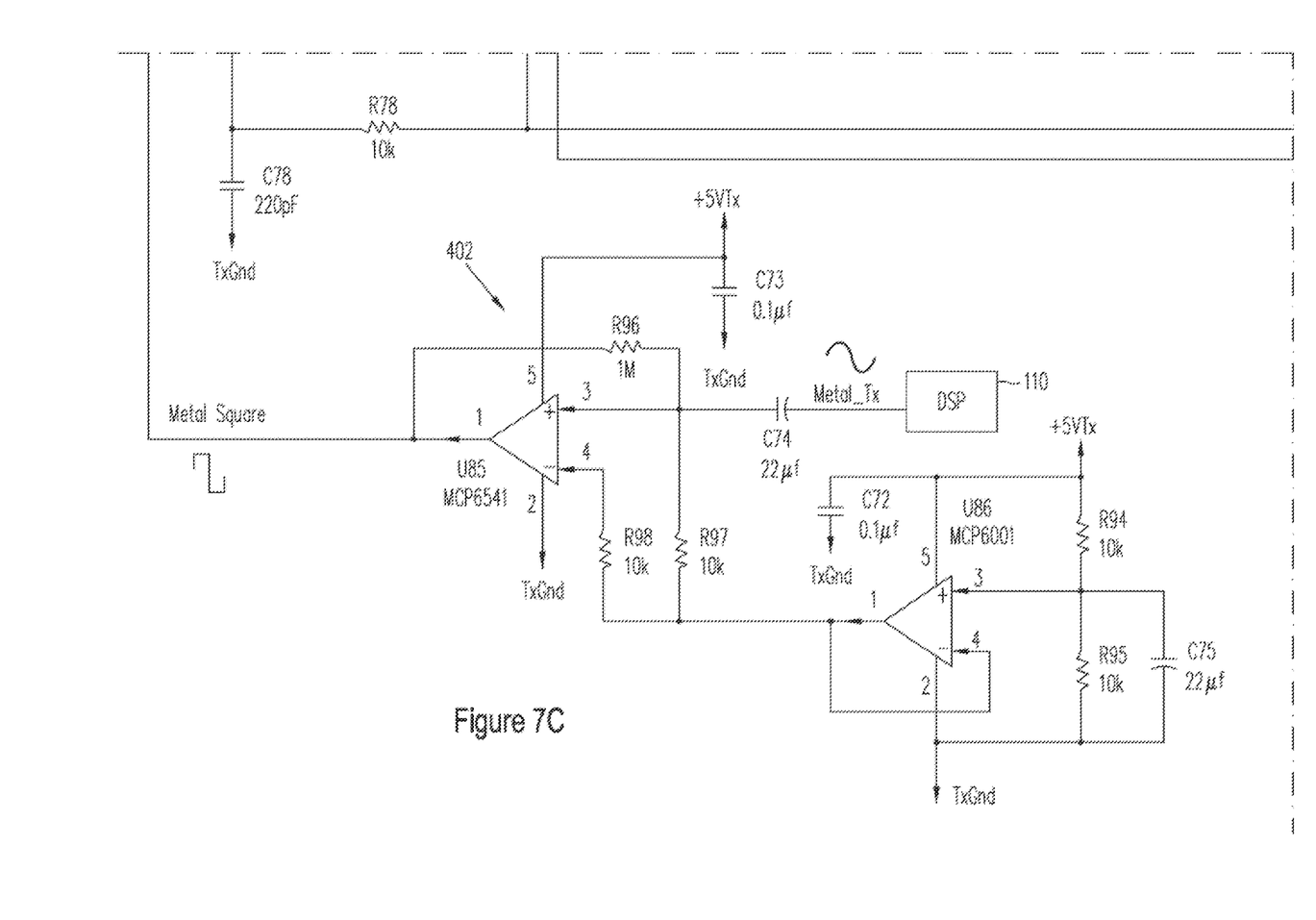
Figure 7D:
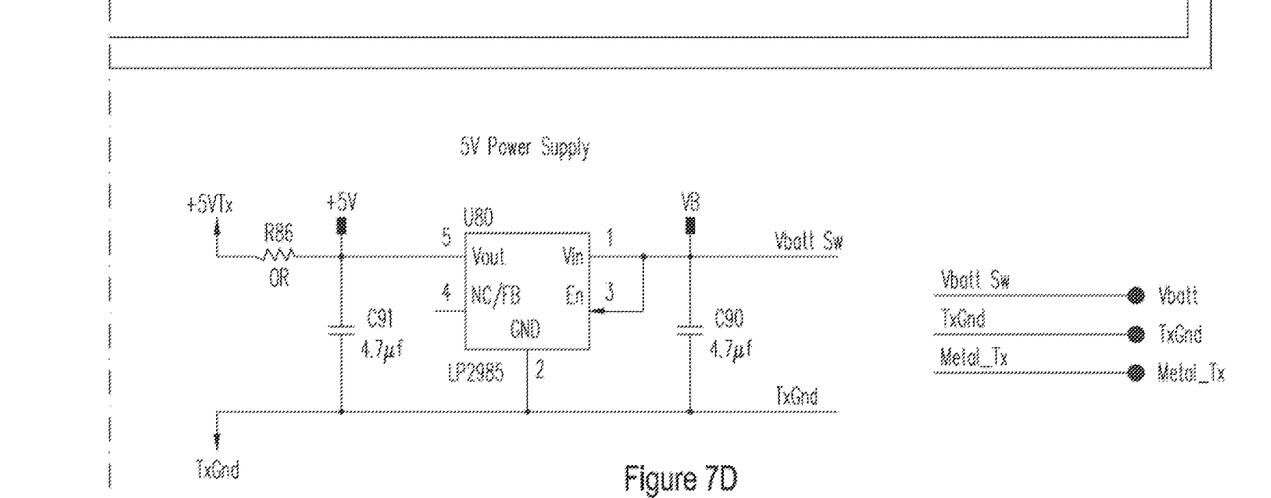

FIG. 6B shows a top view of structure 604 and tuners 606 and 608. Tuners 606 and 608 can be metal plates that are physically adjusted along slots 610 and 612, respectively. In some embodiments, tuner 606 can be a non-ferrous material (e.g., aluminum) and tuner 608 can be a ferrous material (e.g., iron). Each of tuners 606 and 608 alter the magnetic field produced by antenna 306 and can be used to zero or bias the differential output signals between antennas 302 and 304.

As discussed previously, an object brought into the proximity of antennas 302 and 304, for example brought close to housing 500 next to antenna 302, will alter the magnetic field. The difference in magnetic field between antennas 302 and 304 that result from the distortion from the object is detected as a differential output signal between antennas 302 and 304. As further discussed above, a ferromagnetic object will alter the field such that the differential signal changes in a first direction (either increasing or decreasing) while a conductive material will alter the field such that the differential signal changes in a direction opposite the first direction. In that case, and considering that tarmac is slightly ferromagnetic while manhole covers are not, tuners 606 and 608 can be adjusted to provide a slight bias so that proximity to a ferromagnetic will cause the differential signal to decrease while proximity to a conductive material will cause the differential signal to increase.

FIG. 6C illustrates the magnetic fields 620 generated by antenna 306 passing through antennas 302 and 304. As discussed previously, antenna 306 is positioned to supply a magnetic field that is substantially equal in intensity but opposite in direction at antennas 302 and 304.

Figure 8A:
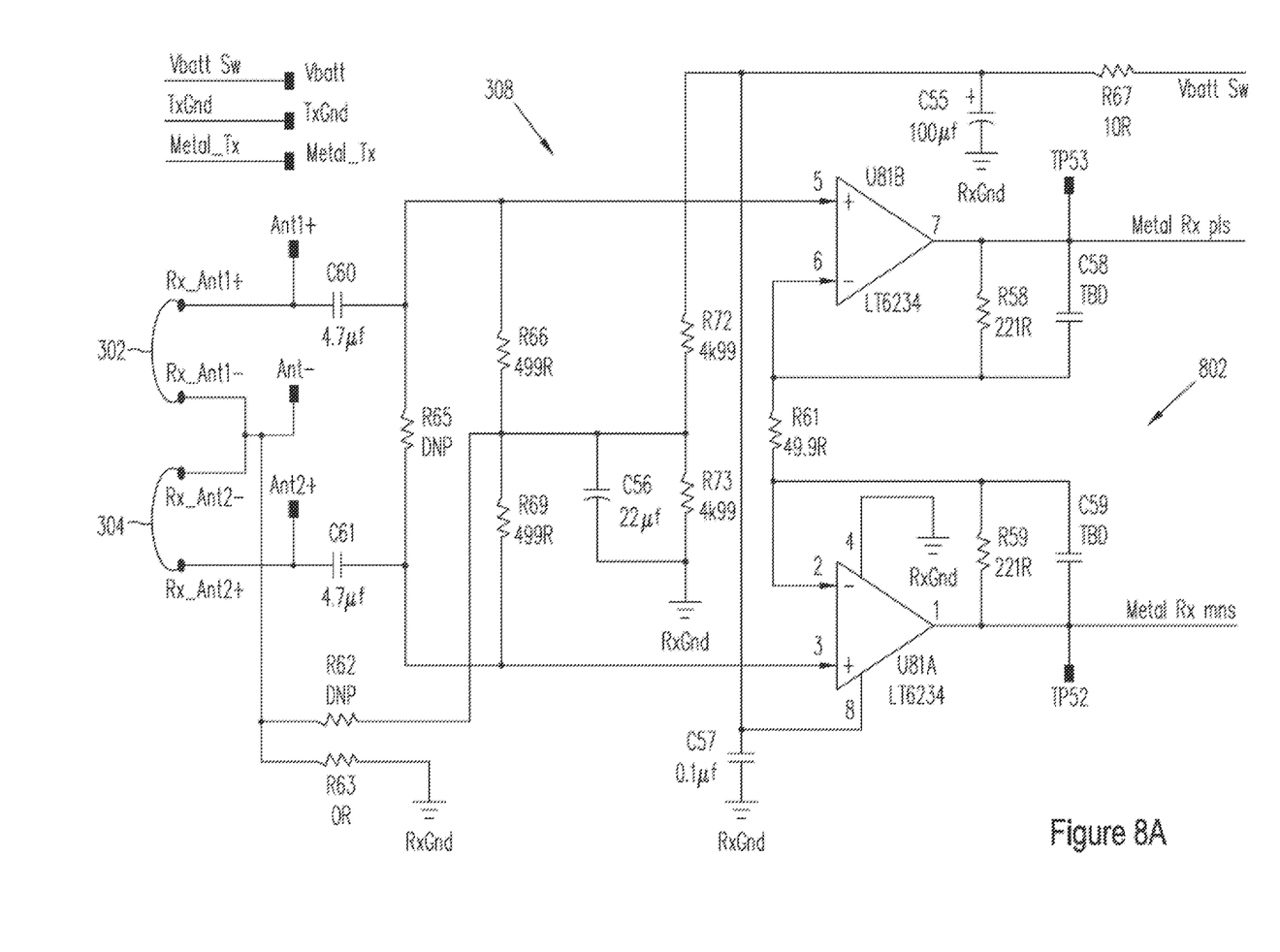
FIGS. 8A and 8B illustrate an example of the receiver section of the metal detector portion of the line locator system according to some embodiments of the present invention.
Figure 8B:
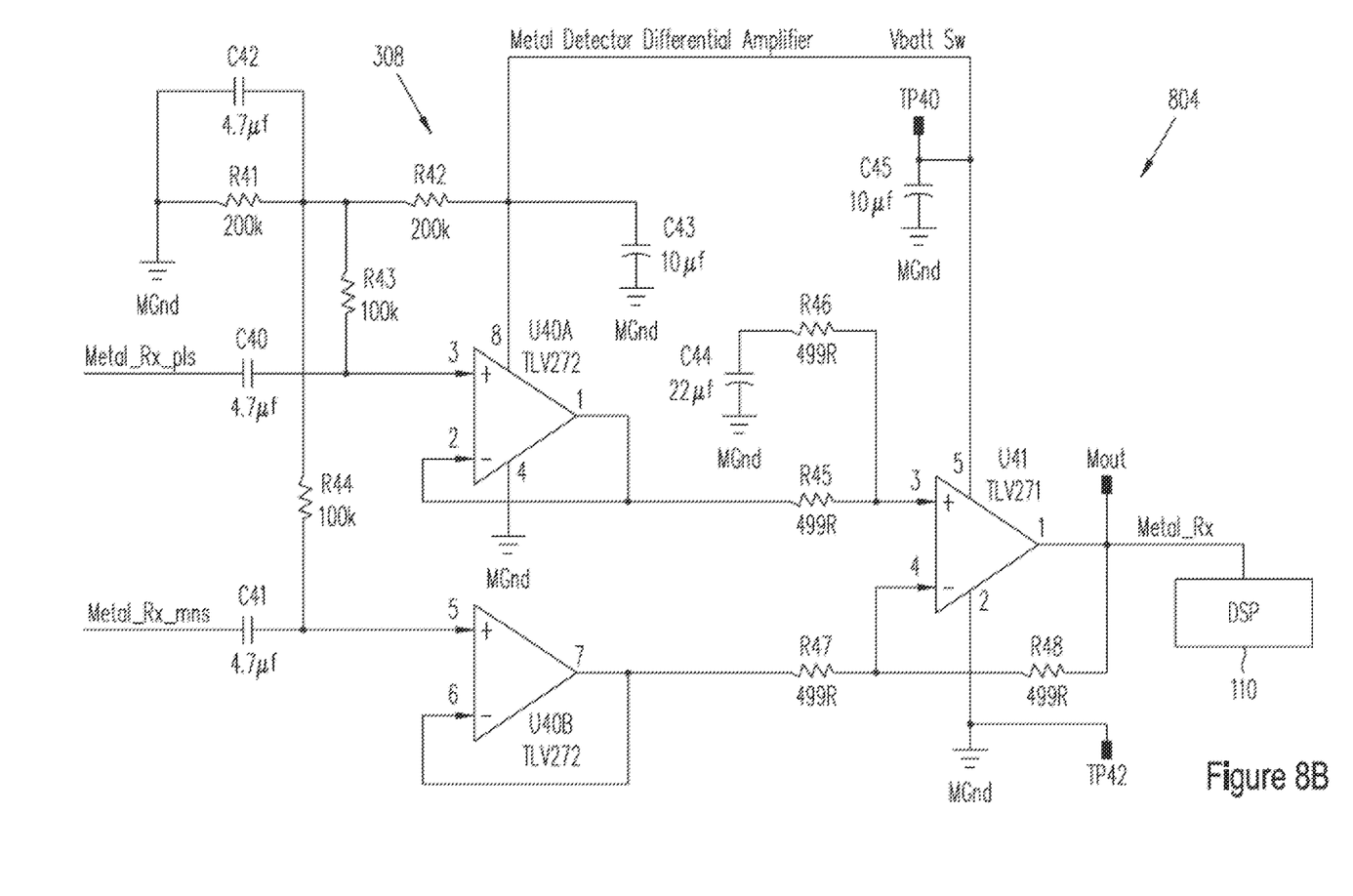

FIGS. 7A-D illustrate in more detail transmitter 310 and antenna 306, as was previously discussed with FIG. 4B. FIGS. 8A and 8B illustrate in more detail the receiver 308 illustrated in FIG. 4A. As shown in FIG. 8A, the differential signal from antennas 302 and 304 is input to electronics 802. As shown in FIG. 8B, the output signals from electronics 802 are input into a differential amplifier 804. The output signal from differential amplifier 804 is input to DSP 110 for digital processing.

Figure 9:
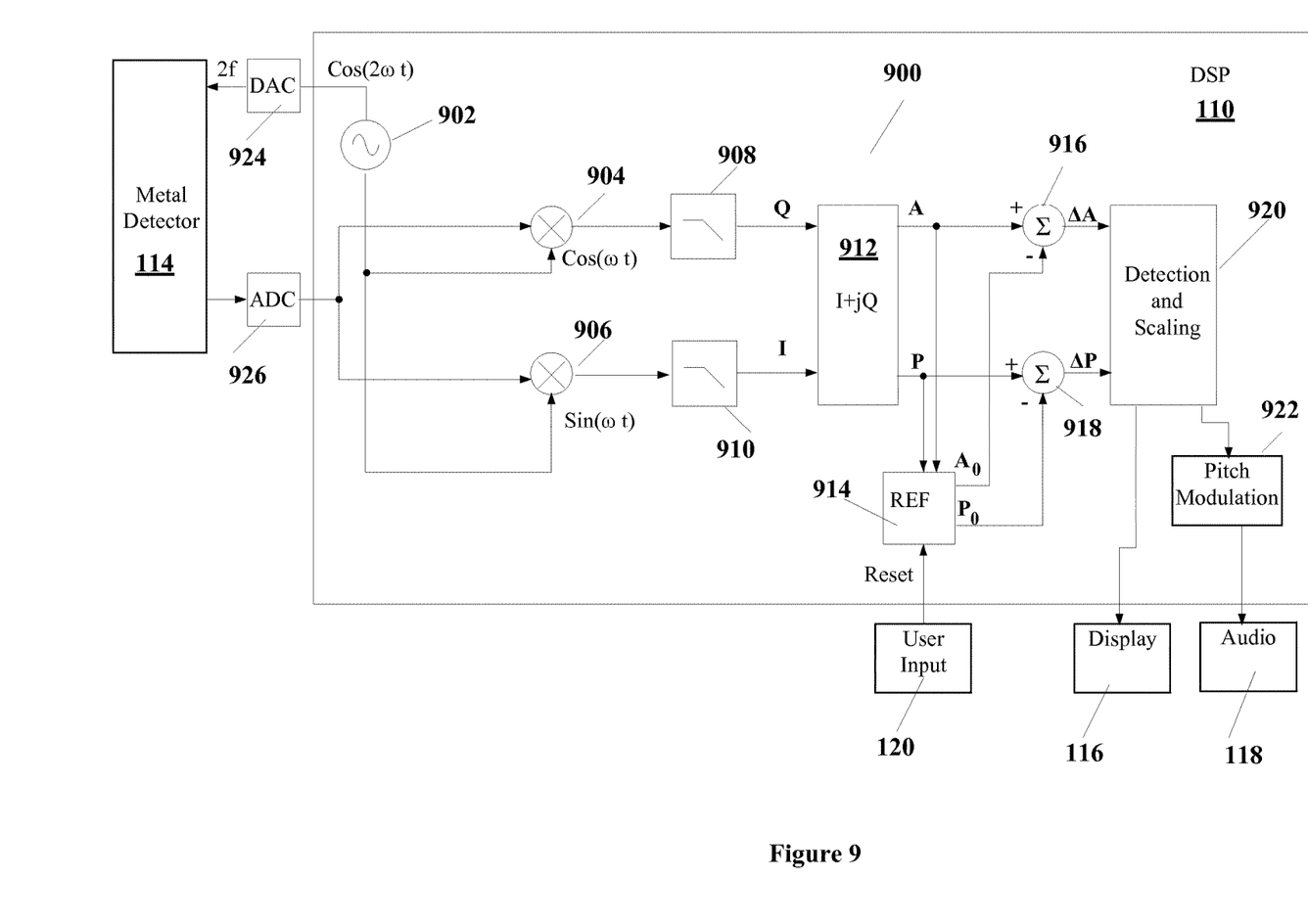
FIG. 9 illustrates an example process for operation of a digital signal processor in a metal detection mode using the metal detection portion of the line locator system according to some embodiments of the present invention.

FIG. 9 illustrates an example procedure 900 executed by DSP 110 to operate metal detector 114 according to some embodiments of the present invention. Procedure 900 can be executed as software instructions by DSP 110. The software instructions can be stored in non-volatile memory that is readable by DSP 110. Procedure 900 can be operated by DSP 110 when line locator system 100 is in metal detection mode.

As shown in FIG. 9, procedure 900 includes a sine-wave generator 902. Sine-wave generator generates a signal with frequency 2f given by cos(2 wt) to a digital-to-analog converter (DAC) 924, where w=2πf. DAC 924 provides the analog cosine wave with frequency 2f to transmitter portion 310 of metal detector 114 as illustrated in FIG. 4B. In some embodiments, the frequency f can be, for example, 6025 Hz so that 2f is 12.05 kHz. The sinusoidal wave from sine-wave generator 902 is continuously generated while DSP 110 is in metal detection mode.

As is further shown in FIG. 9, analog-to-digital converter (ADC) 926 receives a signal from receiver 308 of metal detector 114, as is illustrated in FIG. 4A. ADC 926 digitizes the signal from metal detector 114 and the digitized signal is input to mixers 904 and 906. Mixer 904 receives a cos(f) signal from sine-wave generator 902 while mixer 906 receives a sin(wt) signal from sine-wave generator 902. Mixer 904 multiplies the signal from ADC 926 with cos(wt) while mixer 906 multiples the signal from ADC 926 with sin(wt).

The result of mixer 904 is input to low-pass decimation filter 908, which outputs a signal corresponding to the quadrature signal Q from the output signal provided by metal detector 114. The result of mixer 906 is input to low-pass decimation filter 910, which outputs a signal corresponding to the in-phase signal I from the output signal provided by metal detector 114. Signals I and Q are input to block 912, which determines the amplitude A and phase P of the signal received from metal detector 114. The amplitude A is input to summer 916, which subtracts a reference signal $A_0$ to determine the change in amplitude ΔA. The phase P is input to summer 918, which substrates a reference signal $P_0$ to determine the change in phase ΔP. The reference signals $A_0$ and $P_0$ are held in reference block 914. Reference block 914 can set the reference signals $A_0$ and $P_0$ to signals A and P when a reset signal is received from user input 120. In that fashion, the change in amplitude ΔA and change in phase ΔP calculated in summers 916 and 918 can be set to zero.

The change in amplitude ΔA and change in phase ΔP are input to detection and scaling 920 and are indicative of movement of line locator system 100 into proximity with a metal. Detection and scaling 920 outputs to display 116 and indication of the changes. Display 116, for example, can provide a bar-graph or other visual indication related to the changes in the signal from metal detector 114. Further, detection and scaling 920 outputs a similar signal to pitch modulation 922, which drives audio block 118 for an audio indication of the changes in signal from metal detector 114.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A line locator system, the system comprising:
   a digital signal processor in a housing;
   a line locator portion mounted in the housing and coupled to the digital signal processor; and an active metal detector mounted in the housing and coupled to the digital signal processor, the active metal detector comprising:
  a first receive antenna mounted in the housing;
  a second receive antenna mounted in the housing parallel with the first receive antenna and a distance from the first receive antenna along a direction perpendicular to a plane of the first receive antenna; and
  a transmitter antenna mounted between the first receive antenna and the second receive antenna and oriented to provide a magnetic field in a first direction through the first receive antenna and in an opposite direction through the second receive antenna, the magnetic field being of equal strength at the first receive antenna and the second receive antenna;
wherein the digital signal processor is configured to:
  receive a signal from the active metal detector;
  determine an in-phase signal I and a quadrature signal Q of the received signal;
  determine an amplitude A and a phase P of the received signal from the in-phase signal I and the quadrature signal Q;
  determine changes in the amplitude A and changes in the phase P; and
  generate outputs that indicate proximity to a metal object based on the changes in the amplitude A and the phase P.

2. The system of claim 1, wherein the first receive antenna and the second receive antenna are electrically coupled and further coupled to a receiver, the receiver including a differential amplifier coupled to provide a signal related to a difference in the magnetic field detected by the first receive antenna and the magnetic field detected by the second receive antenna to the digital signal processor.

3. The system of claim 2, wherein the magnetic field provided by the transmitter antenna is distorted with a tuner such that an output of the receiver is biased.

4. The system of claim 3, wherein the tuner includes one or more metallic plates mounted proximate to the transmitter antenna.

5. The system of claim 1, wherein the transmitter antenna is coupled to a transmitter, the transmitter receiving a sinusoidal signal from the digital signal processor and providing a driving current to the transmitter antenna.

6. The system of claim 5, wherein the transmitter includes:
  a zero crossing detector that receives the sinusoidal signal and produces a first square wave with a same phase as the sinusoidal signal;
  a divide-by-2 that produces a second square wave having a frequency that is half the frequency of the first square wave and a third square wave that is complementary to the second square wave; and
  a switching bridge driven by the first square wave and the third square wave, the switching bridge coupled to the transmitter antenna.

7. The system of claim 1, wherein the digital signal processor is further configured to:
  generate a sinusoidal wave having frequency 2f that is output to the active metal detector, wherein the received signal has a frequency f.

8. The system of claim 7, wherein generating outputs includes providing display signals to a display coupled to the digital signal processor.

9. The system of claim 7, wherein generating outputs includes providing audio signals to an audio output coupled to the digital signal processor.

10. A method of detecting a metal object with a line locator system, comprising:
  generating a sinusoidal signal with a digital signal processor;
  generating a transmitted magnetic field based on the sinusoidal signal with a transmitter antenna, the transmitter antenna being mounted in a housing;
  generating a first signal by detecting the transmitted magnetic field in a first direction with a first antenna, the first antenna being mounted in the housing;
  generating a second signal by detecting the transmitted magnetic field in a second direction with a second antenna, the second antenna being mounted in the housing parallel with the first antenna and a distance from the first antenna along a direction perpendicular to a plane of the first antenna;
  generating a detection signal based on a difference between the first signal and the second signal;
  determining, using the digital signal processor, an in-phase signal I and a quadrature signal Q of the detection signal;
  determining, using the digital signal processor, an amplitude A and a phase P of the detection signal from the in-phase signal I and the quadrature signal Q;
  determining, using the digital signal processor, changes in the amplitude A and changes in the phase P;
  determining, using the digital signal processor, proximity to the metal object based on the changes in the amplitude A and the phase P; and
displaying an indication of proximity to the metal object;
wherein the transmitter antenna is mounted in the housing between the first antenna and the second antenna and oriented to provide the transmitted magnetic field in the first direction through the first antenna and in the second direction through the second antenna, the transmitted magnetic field being of equal strength at the first antenna and the second antenna and the first direction being opposite in direction from the second direction.

11. The method of claim 10, wherein generating the transmitted magnetic field includes:
  receiving the sinusoidal signal from the digital signal processor;
  generating a first square wave based on zero-crossings of the sinusoidal signal;
  providing a second square wave and a third square wave that is complementary to the second square wave; and
  controlling a switching bridge coupled across the transmitter antenna with the second square wave and the third square wave.

12. The method of claim 10, further including tuning to bias the detection signal.

13. The method of claim 12, wherein tuning includes moving one or more metallic plates within the transmitted magnetic field generated by the transmitter antenna.

14. An apparatus comprising:
  a metal detector coupled to a digital signal processor, the metal detector comprising a housing including:
    a first antenna mounted in the housing and configured to produce a first signal in response to detecting a magnetic field in a first direction;
    a second antenna mounted in the housing parallel with the first antenna and a distance from the first antenna along a direction perpendicular to a plane of the first antenna, the second antenna configured to produce a second signal in response to detecting a magnetic field in a second direction, the second direction being opposite in direction to the first direction; and a third antenna configured to produce the magnetic field and mounted between the first antenna and the second antenna, the third antenna being oriented to provide the magnetic field in the first direction through the first antenna and the second direction through the second antenna, the magnetic field being of equal strength at the first antenna and the second antenna; and a receiver including a differential amplifier configured to receive the first signal and the second signal and output an output signal to the digital signal processor;

wherein the receiver includes:

a zero crossing detector that receives a sinusoidal signal and produces a first square wave with a same phase as the sinusoidal signal;

a divide-by-2 that produces a second square wave having a frequency that is half the frequency of the first square wave and a third square wave that is complementary to the second square wave; and a switching bridge driven by the second square wave and the third square wave, the switching bridge coupled to the third antenna;

wherein the switching bridge includes:

a first switch and a second switch coupled to a first node, the first node being coupled to a first side of the third antenna;

a third switch and a fourth switch coupled to a second node, the second node being coupled to a second side of the third antenna, the first side being an opposite side of the third antenna from the second side;

wherein the first switch and fourth switch are coupled to receive the third square wave and the second switch and third switch are coupled to receive the second square wave such that current driven through the third antenna is driven in alternate directions.

15. The apparatus of claim 14, wherein the switching bridge is configured to alternately switch voltage across the third antenna to produce an alternating current.

16. The apparatus of claim 14, wherein the magnetic field provided by the third antenna is distorted with a tuner such that an output of the receiver is biased.

17. The apparatus of claim 16, wherein the tuner includes one or more metallic plates mounted proximate to the third antenna.

18. The apparatus of claim 14, wherein the digital signal processor is configured to:

generate a sinusoidal wave having frequency 2f that is output to the metal detector;

receive a signal from the metal detector having a frequency f;

determine an in-phase signal I and a quadrature signal Q of the signal;

determine an amplitude A and a phase P of the signal from the in-phase signal I and the quadrature signal Q;

determine changes in the amplitude A and changes in the phase P; and generate outputs that indicate proximity to a metal object.

* * * * *